United States Patent [19]

Wood

[11] Patent Number: 4,781,249

[45] Date of Patent: Nov. 1, 1988

[54] PROGRESSIVELY INFLATED PACKERS

[75] Inventor: Edward T. Wood, Houston, Tex.

[73] Assignee: Completion Tool Company, Houston, Tex.

[21] Appl. No.: 596,681

[22] Filed: Apr. 4, 1984

[51] Int. Cl.⁴ ............................................. E21B 33/127
[52] U.S. Cl. ..................................... 166/187; 277/34.6
[58] Field of Search ................. 166/187, 387; 277/34.6

[56] References Cited

U.S. PATENT DOCUMENTS

| | | | |
|---|---|---|---|
| 2,831,541 | 4/1958 | Conover | 277/34.6 |
| 3,052,302 | 9/1962 | Lagucki | 277/34.6 |
| 3,525,393 | 8/1970 | Cobbs et al. | 166/187 |
| 4,372,562 | 2/1983 | Carter, Jr. | 166/187 |
| 4,420,159 | 12/1983 | Wood | 166/187 |
| 4,449,584 | 5/1984 | Christensen | 166/187 |
| 4,458,752 | 7/1984 | Brandell | 166/187 |

FOREIGN PATENT DOCUMENTS 718724  9/1965  Canada ............................... 166/187

Primary Examiner—Jerome W. Massie
Assistant Examiner—William P. Neuder

[57] ABSTRACT

An inflatable packer construction where the inflatable elastomer element is; (1) constructed from the same type of rubber compound from end-to-end and the rubber is cured differentially from end-to-end so that inflation is from one end to the other end; (2) is constructed of rubber having different characteristics from end-to-end so that the cured rubber will inflate from one end to the other end; (3) is constructed of rubber having a release agent between one end of the rubber and a mandrel so as to release one end of the rubber first from the mandrel upon inflation; (4) is constructed of rubber having different thicknesses from end-to-end so that one end inflates sooner than the other end; or (5) is constructed of rubber with a segment of the length of the element having a releasable confining element.

8 Claims, 2 Drawing Sheets

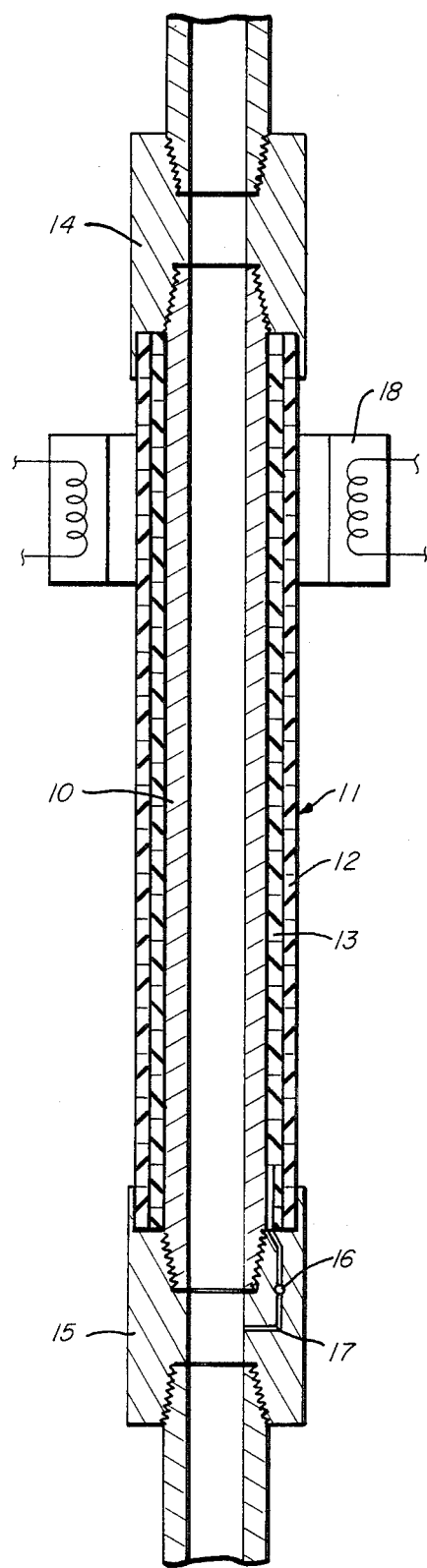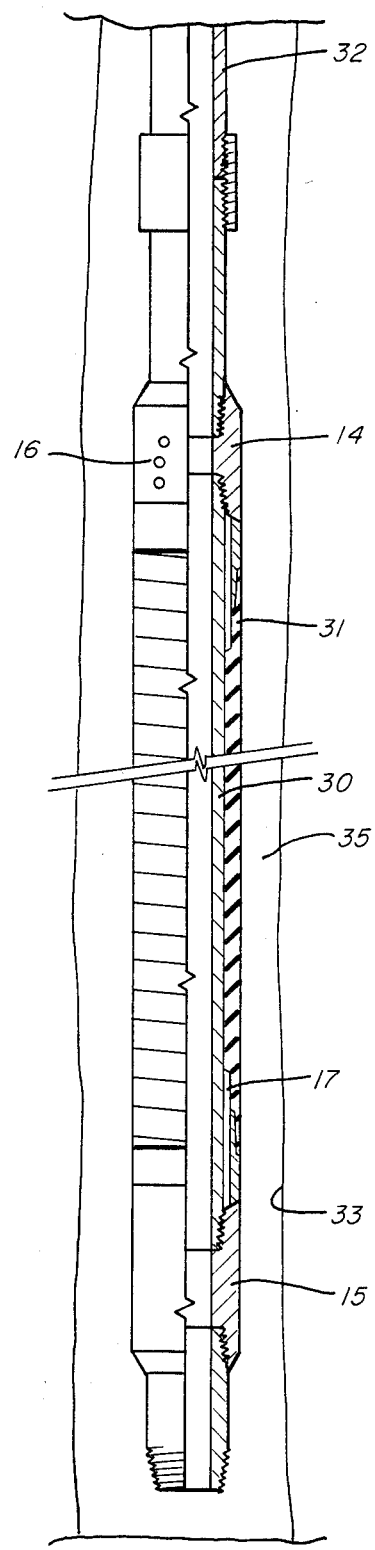
FIG. 1                   FIG. 5

PROGRESSIVELY INFLATED PACKERS

FIELD OF THE INVENTION

This invention relates to inflatable packers for use in well bores traversing earth formations and more particularly to inflatable packers which inflate progressively from one end to the other end on a controlled fashion while in a well bore.

BACKGROUND OF THE PRESENT INVENTION

In the completion of oil wells which traverse earth formations, inflatable packers have been used for a considerable period of time. An inflatable packer typically has a central, longitudinally extending tubular or casing member on which is disposed a tubular elastomer or inflatable packer member. The tubular elastomer member is typically attached or sealed with respect to collars at both of its ends. One of the collars, for example, the lower collar has passage means including valves which control the input of fluid from the interior of the tubular member to the interior of the tubular elastomer member. While the passage means and valves need not be in a collar, they are generally located at or near a collar. When the fluid pressure within the tubular member is increased sufficiently to open an inflate valve in the passage means, the packer element begins to inflate. As the packer element inflates, the fluid that occupies the annulus between the packer element and the well bore is displaced. The fluid in the annulus may, (1) move upward displacing excess fluid from the casing well bore annulus, (2) move downward and enter permeable intervals below the packer, (3) enter permeable intervals adjacent to the packer, (4) initiate and flow into fractures adjacent to or below the packer and/or, (5) become trapped in borehole irregularities preventing complete inflation of the packer.

Since the inflation fluid in long packers is typically cement, upward movement of the displaced fluid is highly desirable as it would: (1) allow for complete unhampered inflation of the packer and (2) minimize the risk of well damage that is often associated with the other displacement modes. Unfortunately this upward displacement of fluid may be hampered by irregular inflation of the packer. For example, inflation of the top of the packer element will prevent upward movement of the displaced fluid. Alternatively, the packer element could inflate in a random manner along its length and trap fluid in the well bore along the sections of the packer element that inflate more slowly.

Attempts to minimize this problem of irregular packer inflation have included placement of the passage means (the inflation entry point of fluid) at the bottom of the packer element. However, this frequently fails because variations in the properties of the inflatable packer element along its length are the dominate factor in determining the section or sections of the packer element that inflate first.

SUMMARY OF THE PRESENT INVENTION

In the present invention, progressive inflation of the packer element is accomplished by a variety of techniques including the following:

1. Controlling the elastomeric properties of the packer element along its length via:
   a. Use of a controlled cure time on the packer element with progressively longer cure being obtained from one end to the other end of the packer element.
   b. Use of a controlled temperature with progressively hotter cure being applied to the packer element from one end to the other end of the packer element.
   c. A variation in the rubber composition blend along the length of the packer element with a progressively harder rubber extended from one end to the other end.
   d. A variation in the thickness of one or more layers of rubber along the length of the packer element to control the expansion properties of the packer element.

2. Controlling the bonding strength between the rubber element and packer mandrel along the length of the rubber element so that a progressively higher pressure from one end to the other is needed to free or expand the rubber element with respect to the mandrel.

3. Proper placement of elastomeric or non-elastomeric material in or outside of the rubber element along the length of the rubber element to positively control the inflation of the packer element in a progressive manner.

The invention further includes packer apparatus for progressive inflation in a well bore and its use whereby the packer element is progressively inflated by proper use of one of the foregoing packer element construction.

BRIEF DESCRIPTION OF THE DRAWINGS

FIG. 1 is a schematic illustration in cross section of one form of the present invention;

FIG. 5 is a schematic illustration in cross section of an expandable packer embodying the present invention and disposed in a well bore.

DESCRIPTION OF THE PRESENT INVENTION

Figure 2:
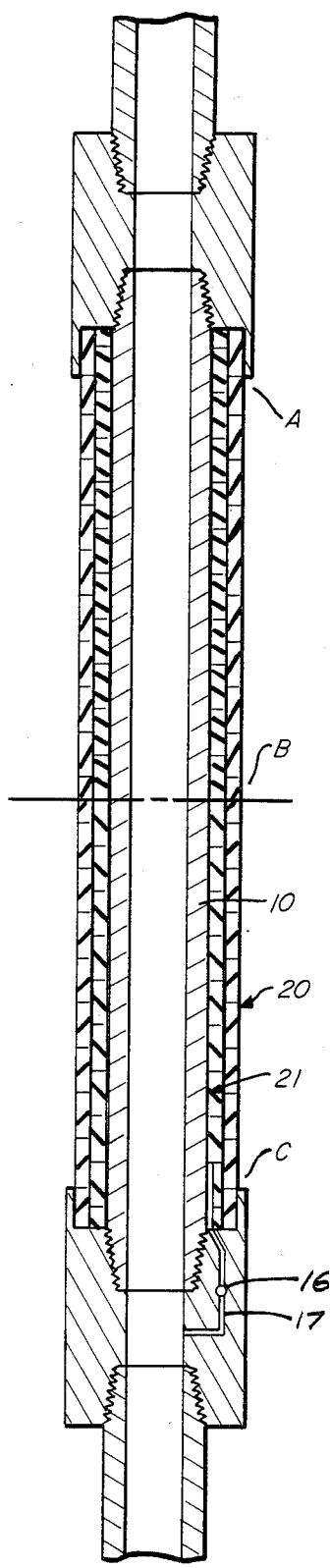
FIG. 2 is a schematic illustration in cross section of one form of the present invention.

Referring now to the drawings, in FIG. 1, a metal tubular member 10 (sometimes referred to as a casing or pipe member) is wrapped with a strip or strips of rubber 11 which is wound about the tubular member 10 in layers 12 and 13 (only two layers being shown for convenience). The type of rubber compound employed may, for example be "HYCAR 1001CG" or "HYCAR 1051" which is supplied by Goodrich and is highly oil resistant to which various components such as accelerators, detackifiers, an antioxidant agent, carbon black, activators, sulfur and retarding agents are added. The length of the tubular member 10 may typically be in the neighborhood of 10 to 40 feet for the application of this invention as it is obvious that short packers of 2 and 4 feet in length do not pose problems. Collars 14 and 15 are attached to the tubular pipe member 10 for coupling the tubular pipe member to a string of casing. Passage means includes a fluid passageway 17 and an inflate valve 16 in one of the collars where the passage means extends from the interior of the tubular member 10 to the interior of the packer element. The packer element is sealingly attached to a collar and thus sealingly attached to the casing member by bonding. Clamping means may also be employed.

To cause the packer element (when cured) to inflate progressively from one end of the packer element at the collar 15 to the other end of the packer element at the collar 14, the curing of the rubber 11 is varied from the end of the packer element at the collar 15 to the end of the packer element at the collar 14 by varying either the time and temperature of the curing, or by varying both the time and temperature of curing from one end to the other end of the packer element. Thus, the modulus of elasticity of the cured rubber packer element will vary from one end to the other end and permit the packer element to progressively inflate upon the application of an inflation pressure through the passageway 17. The curing time is such that the ultimate elongation, i.e. the point where the rubber would tear is adequate to handle the pressures involved in inflating the packer element under well bore conditions.

As will be appreciated, the result of varying the modulus of elasticity of the packer element can be achieved by varying the time of curing with a constant temperature or by varying the temperature over a constant time or by a combination of varying the curing temperature and time. As may be appreciated, the heating can be accomplished by use of an annular heating means 18 through which the elastomer packer element 11 and tubular member 10 are passed. The temperature and time of curing are related to the rubber composition and properties desired in a well known manner. Also, while the rubber is described as cured on the mandrel as a part of a tool, it is possible to form the rubber element separately and then assemble the cured rubber tube with a mandrel.

In a second form of the invention, the length of a tubular member 10 is covered with separate or individually discrete segments of rubber 20 along the length of the tubular member 10 which are comprised of different types of rubber each having different characteristics. For example, as shown in FIG. 2, a first segment of the rubber element 20 from point C to pint B can be wrapped with a rubber element having more carbon black than the segment of the rubber element from point B to point A. The higher percentage of carbon black will increase the modulus of elasticity of the rubber element between points B and C so that the packer element will inflate faster between point B and C than between points B and A.

In another form of the invention, a mold release agent 21 such as mica may be applied to the tubular member 10 between points B and C with a uniform composition of rubber between points A and C so that the segment of the packer element between points B and C releases from the tubular member 10, upon inflation, faster than the segment of the packer element between points B and A.

Figure 3:
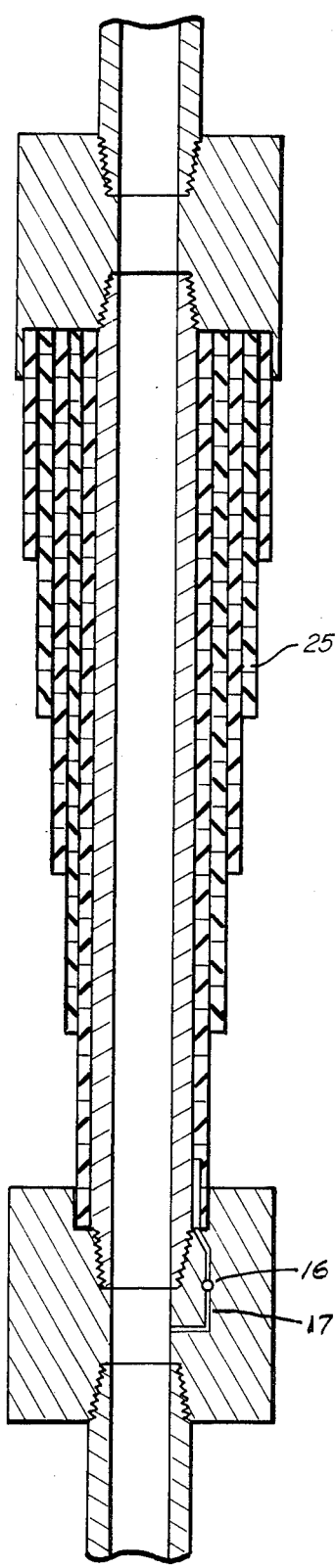
FIG. 3 is a schematic illustration in cross section of one form of the present invention.

In still another embodiment, as shown in FIG. 3, the rubber strips 25 can be wrapped in a taper along the length of the tubular member 10 so that the end of the packer element with a lesser amount of rubber will inflate faster than the other end of the packer with a greater amount of rubber.

Figure 4:
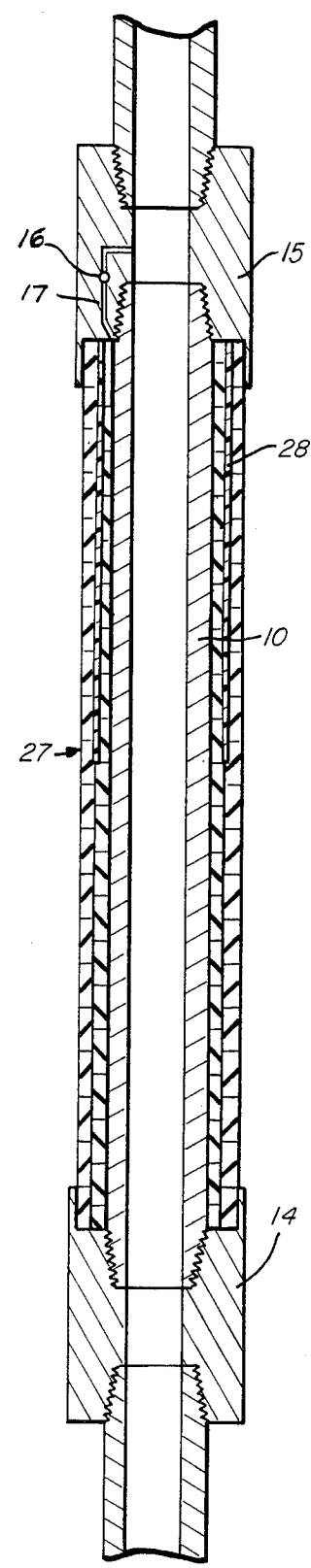
FIG. 4 is a schematic illustration in cross section of another form of the invention.

Referring now to FIG. 4, the rubber strips 27 are wound about a tubular casing member 10. In this instance, a releasable expansion retarding means 28 is disposed between the rubber layers from one collar 15 toward the center of the rubber strips 27 forming the length of the rubber element. The retarding means 28 may be constructed of a heat resistant fabric such as "nylon" which will withstand curing of the rubber and exceed the modulus of elasticity of the cured rubber yet stretch or break upon the application of sufficient pressure. Thus, the retarding means 28 provides a release factor whereby one end of the packer element can be inflated first before inflation of the other end. The retarding means 28 may be disposed on the outer surface of the rubber strips 27, if desired.

As shown in FIG. 5, a tubular mandrel 30 and packer element 31 constructed as described above is incorporated in a casing string 32 and disposed in a well bore 33. The packer element when cured is monolithic in its cross section. Upon application of fluid pressure to the interior of the casing string 32, the passage means 17 (not shown in FIG. 5) in the valve collar 14 admit fluid to the interior between the packer mandrel 30 and packer element 31. The packer element 31 is disposed in the casing string 32 so that the lowermost end of the packer element inflates first. Thus, fluid entering through collar 14 passes downwardly in the interior space between the packer mandrel 30 and the packer element 31 to inflate the packer element from the bottom upwardly while the fluid is admitted at the top of the packer element. The fluid under pressure will cause the packer element 31 to expand progressively from the collar 15 at one end toward the collar 14 at the other end in a progressive manner so that the fluid in the annulus 35 between the packer element and the well bore is moved upwardly as the packer element is expanded into contact with the well bore.

The compounding of rubber to achieve the results described herein is well known to those skilled in the art.

It will be apparent to those skilled in the art that various changes may be made in the invention without departing from the spirit and scope thereof and therefore the invention is not limited by that which is enclosed in the drawings and specifications, but only as indicated in the appended claims.

I claim:

1. An inflatable well packer for use in a well bore comprising:
    a central tubular pipe member with a substantial length;
    an elastomer inflatable member disposed along the length of said pipe member and means at each end of said elastomer member for attaching said elastomer member to said pipe member;
    passage means including valve inflation means for admitting fluid from the interior of said pipe member to the interior of said elastomer inflatable member; and
    said elastomer inflatable member having releasable expansion retarding means extending from one end of said inflatable member towards the center of said inflatable member whereby said elastomer member may be inflated progressively from one end of said inflatable member to the other end of said inflatable member.

2. An inflatable well packer for use in a well bore comprising:
    a central tubular pipe member with a substantial length;
    an elastomer inflatable member disposed along the length of said pipe member and means at each end of said elastomer member for sealingly attaching said elastomer member to said pipe member;
    passage means including valve inflation means for admitting fluid from the interior of said pipe member to the interior of said elastomer inflatable member; and said elastomer member having a tapered outer surface extending from one end of said elastomer inflatable member to the other end of said elastomer inflatable member whereby said elastomer member may be inflated progressively from one end to the other end.

3. An inflatable well packer for use in a well bore comprising:

a central tubular pipe member with a substantial length;

an elastomer inflatable member disposed along the length of said pipe member and means at each end of said elastomer member for sealingly attaching the ends of said elastomer member to said pipe member;

passage means including valve inflation means for admitting fluid from the interior of said pipe member to the interior of said elastomer member; and said elastomer member having means for providing a variable modulus of elasticity along the length of said elastomer member whereby said elastomer member may be inflated progressively along its length.

4. An inflatable well packer for use in a well bore comprising:

a central tubular pipe member with a substantial length;

an elastomer inflatable member disposed along the length of said pipe member and means at each end of said elastomer member for sealingly attaching the ends of said elastomer member to said pipe member;

passage means including valve inflation means for admitting fluid from the interior of said pipe member to the interior of said elastomer member; and means for providing a variable release faster between said elastomer member and said pipe member and permitting a controlled release of said elastomer member with respect to said pipe member upon expansion of said elastomer member, said means for providing a variable release factor extending from one end of said inflatable member toward the center of said inflatable member whereby said inflatable member may be inflated progressively from one end of said inflatable member to its other end.

5. An inflatable well packer for use in a well bore comprising:

a central tubular pipe member with a substantial length;

an elastomer inflatable member disposed along the length of said pipe member and means at each end of said elastomer member for sealingly attaching the ends of said elastomer member to said pipe member;

passage means including valve inflation means for admitting fluid from the interior of said pipe member to the interior of said elastomer member; and said elastomer member having means for providing a variable modulus of elasticity along the length of said elastomer member whereby said elastomer member may be inflated progressively along its length, said means for providing a variable modulus of elasticity being embodied in rubber having different compositional characteristics along the length of the elastomer inflatable member.

6. An inflatable well packer for use in a well bore comprising:

a central tubular pipe member with a substantial length;

an elastomer inflatable member disposed along the length of said pipe member and means at each end of said elastomer member for sealingly attaching the ends of said elastomer member to said pipe member;

passage means including valve inflation means for admitting fluid from the interior of said pipe member to the interior of said elastomer member; and said elastomer member having means for providing a variable modulus of elasticity along the length of said elastomer member whereby said elastomer member may be inflated progressively along its length, said elastomer member having a uniform wall thickness along its length.

7. An inflatable well packer for use in a well bore comprising:

a central tubular pipe member with a substantial length;

an elastomer inflatable member disposed along the length of said pipe member and means at each end of said elastomer member for sealingly attaching the ends of said elastomer member to said pipe member, said elastomer member having a uniform wall thickness along its length;

passage means including valve inflation means for admitting fluid from the interior of said pipe member to the interior of said elastomer member; and means for providing a variable release factor between said elastomer member and said pipe member and permitting a controlled release of said elastomer element with respect to said pipe member upon expansion of said elastomer member, said means for providing a variable release factor extending from one end of said inflatable member toward the center of said inflatable member whereby said inflatable member may be inflated progressively from one end of said inflatable member to its other end.

8. An inflatable well packer for use in a well bore comprising:

a central tubular pipe member with a substantial length;

an elastomer inflatable member disposed along the length of said pipe member and means at each end of said elastomer member for attaching said elastomer member to said pipe member, said elastomer member having a uniform wall thickness along its length;

passage means including valve inflation means for admitting fluid from the interior of said pipe member to the interior of said elastomer inflatable member; and said elastomer inflatable member having releasable expansion retarding means extending from one end of said inflatable member towards the center of said inflatable member whereby said elastomer member may be inflated progressively from one end of said inflatable member to the other end of said inflatable member.

* * * * *